US011893927B2

(12) United States Patent
Kim et al.

(10) Patent No.: US 11,893,927 B2
(45) Date of Patent: Feb. 6, 2024

(54) DISPLAY DEVICE AND METHOD OF DRIVING THE SAME

(71) Applicant: SAMSUNG DISPLAY CO., LTD., Yongin-si (KR)

(72) Inventors: Jung Taek Kim, Yongin-si (KR); Kyun Ho Kim, Yongin-si (KR); Jae Woo Ryu, Yongin-si (KR); Joon Suk Baik, Yongin-si (KR); Se Keun Lee, Yongin-si (KR); Sang Su Han, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/151,142

(22) Filed: Jan. 6, 2023

(65) Prior Publication Data

US 2023/0142908 A1 May 11, 2023

Related U.S. Application Data

(63) Continuation-in-part of application No. 17/220,087, filed on Apr. 1, 2021, now Pat. No. 11,574,574.

(30) Foreign Application Priority Data

Sep. 17, 2020 (KR) ........................ 10-2020-0120072

(51) Int. Cl.
*G09G 3/32* (2016.01)

(52) U.S. Cl.
CPC ....... *G09G 3/32* (2013.01); *G09G 2300/0842* (2013.01); *G09G 2310/027* (2013.01); *G09G 2310/061* (2013.01); *G09G 2310/08* (2013.01); *G09G 2320/0233* (2013.01); *G09G 2320/0247* (2013.01)

(58) Field of Classification Search
CPC ............... G09G 3/20; G09G 2310/027; G09G 2310/061; G09G 2310/08; G09G 2330/028; G09G 2320/0242; G09G 2320/0247; G09G 3/3258; G09G 2320/0233
See application file for complete search history.

(56) References Cited

U.S. PATENT DOCUMENTS 9,786,245 B2 10/2017 Lee et al.
10,638,086 B2 * 4/2020 Ahn ..................... G09G 3/3648
(Continued)

FOREIGN PATENT DOCUMENTS

KR 1020150081848 A 7/2015
KR 1020180039232 A 4/2018
KR 1020190085200 A 7/2019

*Primary Examiner* — Andrew Sasinowski
(74) *Attorney, Agent, or Firm* — CANTOR COLBURN LLP

(57) ABSTRACT

A display device includes a processor which supplies grayscale data in active periods of frame periods and stops supply of the grayscale data in blank periods of the frame periods, a timing controller which generates a change signal when a difference between a first blank period of a first frame period and a second blank period of a second frame period is greater than a threshold value, a power supply which supplies a first power voltage having a voltage level changed based on the change signal to a first power line, and pixels commonly connected to the first power line.

16 Claims, 10 Drawing Sheets

(56) References Cited

U.S. PATENT DOCUMENTS

| | | | | |
|---|---|---|---|---|
| 2019/0147831 | A1* | 5/2019 | Lee | G09G 3/20 345/691 |
| 2019/0206356 | A1* | 7/2019 | Kim | G09G 3/3607 |
| 2019/0213971 | A1 | 7/2019 | Kim et al. | |
| 2020/0074932 | A1* | 3/2020 | Park | G09G 3/3291 |

* cited by examiner

DISPLAY DEVICE AND METHOD OF DRIVING THE SAME

This application is a continuation of U.S. patent application Ser. No. 17/220,087, filed on Apr. 1, 2021, which claims priority to Korean Patent Application No. 10-2020-0120072, filed on Sep. 17, 2020, and all the benefits accruing therefrom under 35 U.S.C. § 119, the content of which in its entirety is herein incorporated by reference.

BACKGROUND

1. Field

The disclosure relates to a display device and a method of driving the same.

2. Description of the Related Art

As an information technology is developed, importance of a display device that is a connection medium between a user and information is emphasized. Accordingly, a use of a display device such as a liquid crystal display device and an organic light emitting display device is increasing.

When a rendering speed of the display device and a display frequency do not match with each other, an issue of tearing, stuttering, and the like may occur. Accordingly, applying a technology of G-sync, Free-sync, or the like to the display device is often proposed to solve such an issue.

SUMMARY

In a display device, where a technology of G-sync, Free-sync, or the like is applied, a fluctuation of display frequency is frequent, and thus flicker may occur.

Embodiments of the invention relate to a display device and a method of driving the display device in which an issue of tearing, stuttering, flicker, and the like is effectively prevented in a process of matching a rendering speed and a display frequency.

An embodiment of a display device according to the disclosure includes a processor which supplies grayscale data in active periods of frame periods and stops supply of the grayscale data in blank periods of the frame periods, a timing controller which generates a change signal when a difference between a first blank period of a first frame period and a second blank period of a second frame period is greater than a threshold value, a power supply which supplies a first power voltage having a voltage level changed based on the change signal to a first power line, and pixels commonly connected to the first power line.

In an embodiment, the first frame period may be a frame period previous to the second frame period.

In an embodiment, when the second blank period is longer than the first blank period, the power supply may supply the first power voltage having an increased voltage level.

In an embodiment, when the second blank period is shorter than the first blank period, the power supply may supply the first power voltage having a decreased voltage level.

In an embodiment, when the second blank period is longer than the first blank period, the power supply may supply the first power voltage having a decreased voltage level.

In an embodiment, when the second blank period is shorter than the first blank period, the power supply may supply the first power voltage having an increased voltage level.

In an embodiment, the power supply may supply a second power voltage to a second power line, the pixels may be commonly connected to the second power line, and when the second blank period is longer than the first blank period, the power supply may supply the first power voltage and the second power voltage in a way such that a difference between the first power voltage and the second power voltage decreases.

In an embodiment, when the second blank period is shorter than the first blank period, the power supply may supply the first power voltage and the second power voltage in a way such that the difference between the first power voltage and the second power voltage increases.

In an embodiment, the timing controller may include a blank period calculator which calculates a blank count value by counting the second blank period using a clock signal, a memory which provides a previous count value for the first blank period, and a blank period comparator which generates the change signal when a difference between the blank count value and the previous count value is greater than the threshold value.

In an embodiment, the processor may provide a data enable signal in an enable level while the grayscale data is supplied and provide the data enable signal in a disable level during the blank periods, and the blank period calculator may count the second blank period while the data enable signal is in the disable level.

In an embodiment, the memory may update the previous count value to the blank count value.

An embodiment of a method of driving a display device according to the disclosure includes stopping, by a processor of the display device, supply of grayscale data in a first blank period of a first frame period, calculating, by a timing controller of the display device, the first blank period, stopping, by the processor, the supply of the grayscale data in a second blank period of a second frame period after the first frame period, calculating, by the timing controller, the second blank period, generating, by the timing controller, a change signal when a difference between the first blank period and the second blank period is greater than a threshold value, supplying, by a power supply of the display device, a first power voltage having a voltage level changed based on the change signal to a first power line, and receiving, by pixels of the display device, the first power voltage, where the pixels are commonly connected to the first power line.

In an embodiment, when the second blank period is longer than the first blank period, the power supply may supply the first power voltage having an increased voltage level.

In an embodiment, when the second blank period is shorter than the first blank period, the power supply may supply the first power voltage having a decreased voltage level.

In an embodiment, when the second blank period is longer than the first blank period, the power supply may supply the first power voltage having a decreased voltage level.

In an embodiment, when the second blank period is shorter than the first blank period, the power supply may supply the first power voltage having an increased voltage level.

In an embodiment, the method may further include supplying, by the power supply, a second power voltage to a second power line, and receiving, by the pixels, the second power voltage, where the pixels are commonly connected to the second power line, and when the second blank period is longer than the first blank period, the power supply may supply the first power voltage and the second power voltage so that a difference between the first power voltage and the second power voltage decreases.

In an embodiment, when the second blank period is shorter than the first blank period, the power supply may supply the first power voltage and the second power voltage in a way such that the difference between the first power voltage and the second power voltage increases.

In an embodiment, the method may further include calculating, by the timing controller, a previous count value by counting the first blank period using a clock signal, calculating, by the timing controller, a blank count value by counting the second blank period using the clock signal, and generating, by the timing controller, the change signal when a difference between the blank count value and the previous count value is greater than the threshold value.

In an embodiment, the processor may provide a data enable signal in an enable level while the grayscale data is supplied and provide the data enable signal in a disable level during the first and second blank periods, and the timing controller may count the first and second blank periods while the data enable signal is in the disable level.

Embodiments of a display device and a method of operating the display device according to the disclosure may prevent an issue of tearing, stuttering, flicker, and the like in a process of matching a rendering speed and a display frequency.

BRIEF DESCRIPTION OF THE DRAWINGS

The above and other features of the disclosure will become more apparent by describing in further detail embodiments thereof with reference to the accompanying drawings, in which.

DETAILED DESCRIPTION

Figure 1:
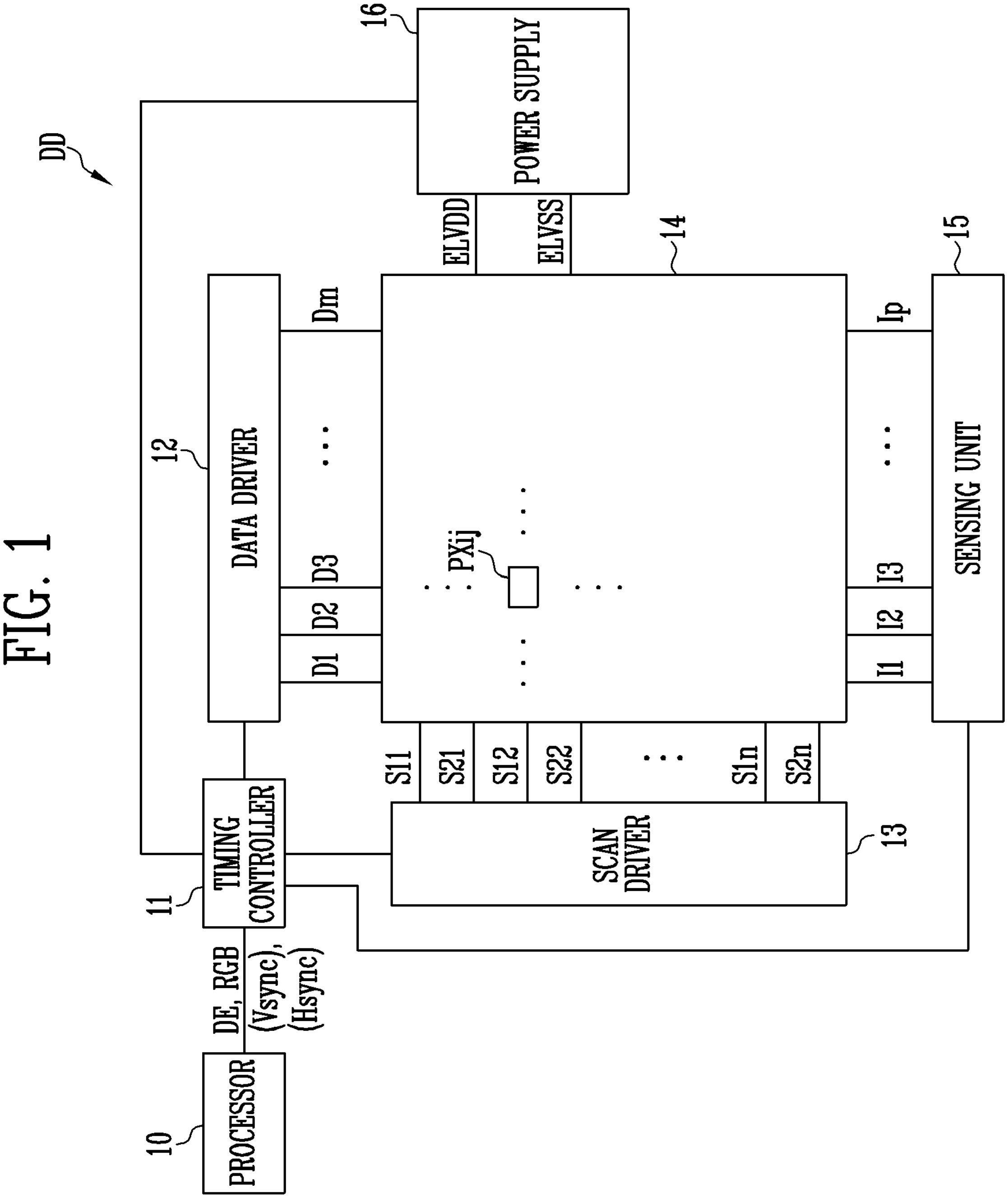
FIG. 1 is a diagram illustrating a display device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In order to clearly describe the disclosure, parts that are not related to the description are omitted, and the same or similar components are denoted by the same reference numerals throughout the specification. Therefore, the above-described reference numerals may be used in other drawings.

In addition, sizes and thicknesses of each component shown in the drawings are arbitrarily shown for convenience of description, and thus the disclosure is not necessarily limited to those shown in the drawings. In the drawings, thicknesses may be exaggerated to clearly express various layers and areas.

In addition, an expression "is the same" in the description may mean "is substantially the same". That is, the expression "is the same" may be the same enough for those of ordinary skill to understand that it is the same. Other expressions may also be expressions in which "substantially" is omitted.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

FIG. 1 is a diagram illustrating a display device according to an embodiment of the disclosure.

Referring to FIG. 1, an embodiment of the display device DD may include a processor 10, a timing controller 11, a data driver 12, a scan driver 13, a pixel unit 14, and a sensing unit 15, and a power supply (or a power supply unit) 16.

In an embodiment, the processor 10 may supply a data enable signal DE and grayscale data RGB to the timing controller 11. According to an embodiment, the processor 10 may supply a vertical synchronization signal Vsync and a horizontal synchronization signal Hsync. The processor 10 may be included in (or defined by at least a portion of) a graphics processing unit ("GPU"), a central processing unit ("CPU"), an application processor ("AP"), or the like. The processor 10 may refer to one integrated chip ("IC") or a group configured of a plurality of ICs.

The processor 10 may generate the grayscale data RGB for each of images by performing rendering.

The processor 10 may supply the grayscale data RGB in active periods of frame periods and stop the supply of the grayscale data RGB in blank periods of the frame periods. In such an embodiment, the processor 10 may inform whether the grayscale data RGB is supplied, using the data enable signal DE. In one embodiment, for example, the data enable signal DE may be in an enable level while the grayscale data RGB is supplied, and may be in a disable level during the blank periods. In one embodiment, for example, in each active period, the data enable signal DE may include pulses of the enable level in a horizontal period unit. The grayscale data RGB may be supplied in a horizontal line unit in correspondence with the pulse of the enable level of the data enable signal DE. A horizontal line may mean pixels (for example, a pixel row) connected to a same scan line.

Periods of the vertical synchronization signal Vsync may correspond to frame periods, respectively. In one embodiment, for example, when the vertical synchronization signal Vsync is in a logic high level, the vertical synchronization signal Vsync may indicate an active period of a corresponding frame period, and when the vertical synchronization signal Vsync is in a logic low level, the vertical synchronization signal Vsync may indicate a blank period of the corresponding frame period. Periods of the horizontal synchronization signal Hsync may correspond to horizontal periods, respectively.

The timing controller 11 may receive the data enable signal DE and the grayscale data RGB from the processor 10. According to an embodiment, the timing controller 11 may receive the vertical synchronization signal Vsync and the horizontal synchronization signal Hsync from the processor 10.

In an embodiment, the timing controller 11 may supply control signals in correspondence with a specification of the data driver 12, the scan driver 13, the power supply 16, the sensing unit 15, and the like. In such an embodiment, the timing controller 11 may provide the processed or unprocessed grayscale data RGB to the data driver 12.

According to an embodiment, the timing controller 11 may generate a change signal when a difference between a first blank period of a first frame period and a second blank period of a second frame period is greater than a threshold value. In such an embodiment, the first frame period may be a frame period previous to the second frame period. In one embodiment, for example, the first frame period and the second frame period may be two consecutive periods.

The data driver 12 may generate data voltages to be provided to data lines D1, D2, D3, and Dm by using the grayscale data RGB and the control signals. In one embodiment, for example, the data driver 12 may sample the grayscale data RGB using a clock signal and apply the data voltages corresponding to the grayscale data RGB to the data lines D1 to Dm in a pixel row unit. Here, m may be an integer greater than 0.

The scan driver 13 may receive a clock signal, a scan start signal, and the like from the timing controller 11 and generate first scan signals to be provided to first scan lines S11, S12, and S1*n* and second scan signals to be provided to the second scan lines S21, S22, and S2*n*. Here, n may be an integer greater than 0.

The scan driver 13 may sequentially supply the first scan signals having a pulse of a turn-on level to the first scan lines S11, S12, and S1*n*. In such an embodiment, the scan driver 13 may sequentially supply the second scan signals having a pulse of a turn-on level to the second scan lines S21, S22, and S2*n*.

In one embodiment, for example, the scan driver 13 may include a first scan driver connected to the first scan lines S11, S12, and S1*n*, and a second scan driver connected to the second scan lines S21, S22, and S2*n*. Each of the first scan driver and the second scan driver may include scan stages in a form of a shift register. Each of the first scan driver and the second scan driver may generate scan signals by sequentially transferring a scan start signal of a pulse form of a turn-on level to a next scan stage under control of the clock signal.

According to an embodiment, the first scan signals and the second scan signals may be the same as each other. In such an embodiment, the first scan line and the second scan line connected to each pixel PXij may be connected to a same node. In such an embodiment, the scan driver 13 may not be divided into a first scan driver and a second scan driver, and may be configured as a single scan driver.

The sensing unit 15 may receive the control signal from the timing controller 11 and supply an initialization voltage to the sensing lines 11, 12, 13, and Ip, or may receive a sensing signal. In one embodiment, for example, the sensing unit 15 may supply the initialization voltage to the sensing lines 11, 12, 13, and Ip during at least a portion of a display period. In one embodiment, for example, the sensing unit 15 may receive the sensing signal through the sensing lines 11, 12, 13, and Ip during at least a portion of a sensing period. Here, p may be an integer greater than 0.

The sensing unit 15 may include sensing channels connected to the sensing lines 11, 12, 13, and Ip. In one embodiment, for example, the sensing lines 11, 12, 13, and Ip and the sensing channels may correspond one-to-one.

The pixel unit 14 includes pixels. Each pixel PXij may be connected to a corresponding data line, a scan line, and a sensing line. A structure of an embodiment of a pixel PXij will described later in detail with reference to FIG. 2.

The power supply 16 may be connected to the pixels through power lines ELVDD and ELVSS. The pixels may be commonly connected to the power lines ELVDD and ELVSS. The power supply 16 may supply power voltages to the power lines ELVDD and ELVSS. In one embodiment, for example, during the display period of the pixel unit 14, a power voltage of a first power line ELVDD may be greater than a power voltage of a second power line ELVSS.

In an embodiment, the power supply 16 may supply a power voltage having a voltage level changed based on the change signal to the second power line ELVSS. In an alternative embodiment, the power supply 16 may supply the power voltage having the voltage level changed based on the change signal to the first power line ELVDD. In another alternative embodiment, the power supply 16 may supply power voltages having voltage levels changed based on the change signal to the first and second power lines ELVSS and ELVDD.

Figure 2:
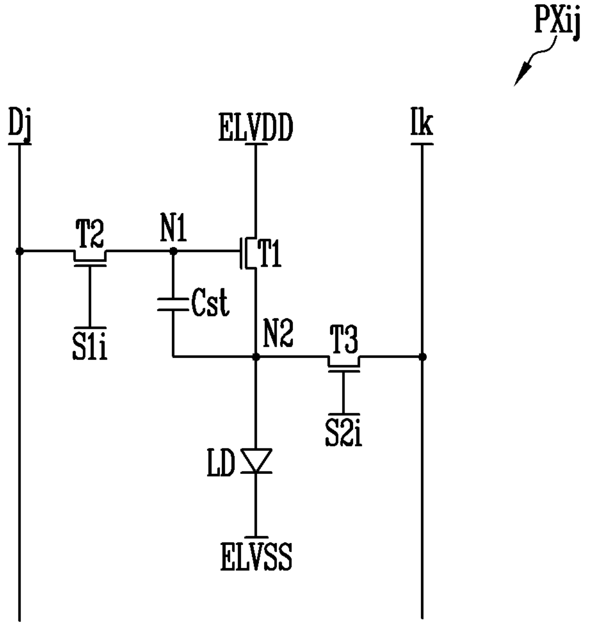
FIG. 2 is a diagram illustrating a pixel according to an embodiment of the disclosure.
Figure 3:
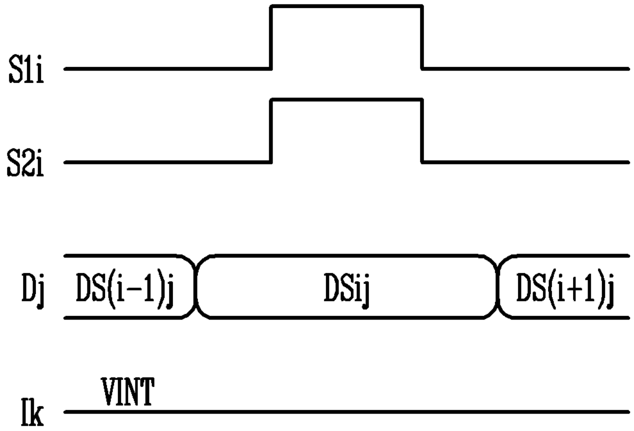
FIG. 3 is a diagram illustrating a method of driving a pixel according to an embodiment of the disclosure.

FIG. 2 is a diagram illustrating a pixel according to an embodiment of the disclosure. FIG. 3 is a diagram illustrating a method of driving a pixel according to an embodiment of the disclosure.

Referring to FIG. 2, an embodiment of a pixel PXij may include transistors T1, T2, and T3, a storage capacitor Cst, and a light emitting diode LD.

In an embodiment, the transistors T1, T2, and T3 may be N-type transistors. In an alternative embodiment, the transistors T1, T2, and T3 may be P-type transistors. In another alternative embodiment, the transistors T1, T2, and T3 may be a combination of an N-type transistor and a P-type transistor. The P-type transistor collectively refers to a transistor in which an amount of a flowing current increases when a voltage difference between a gate electrode and a source electrode increases in a negative direction. The N-type transistor collectively refers to a transistor in which an amount of a flowing current increases when a voltage difference between a gate electrode and a source electrode increases in a positive direction. The transistor may be configured in various forms such as a thin film transistor ("TFT"), a field effect transistor ("FET"), and a bipolar junction transistor ("BJT").

The first transistor T1 may include a gate electrode connected to a first node N1, a first electrode connected to the power line ELVDD, and a second electrode connected to a second node N2. The first transistor T1 may be referred to as a driving transistor.

The second transistor T2 may include a gate electrode connected to the first scan line S1*i*, a first electrode connected to the data line Dj, and a second electrode connected to the first node N1. The second transistor T2 may be referred to as a scanning transistor.

The third transistor T3 may include a gate electrode connected to a second scan line S2*i*, a first electrode connected to the second node N2, and a second electrode connected to a sensing line lk. The third transistor T3 may be referred to as a sensing transistor.

The storage capacitor Cst may include a first electrode connected to the first node N1 and a second electrode connected to the second node N2.

The light emitting diode LD may include an anode connected to the second node N2 and a cathode connected to the power line ELVSS. The light emitting diode LD may be f an organic light emitting diode, an inorganic light emitting diode, a quantum dot/well light emitting diode, or the like. In an embodiment, the light emitting diode LD may include a plurality of light emitting diodes connected in series, in parallel, or in series and parallel.

During the display period, a power voltage of the power line ELVDD may be greater than a power voltage of the power line ELVSS. In an embodiment, the power voltage of the power line ELVSS may be selectively set to be greater than the power voltage of the power line ELVDD to prevent light emission of the light emitting diode LD.

FIG. 3 shows an embodiment of waveform of signals applied to the scan lines S1*i* and S2*i*, the data line Dj, and the sensing line lk connected to the pixel PXij during a horizontal period corresponding to the scan lines S1*i* and S2*i*. Here, k may be an integer greater than 0. One frame period may include a plurality of horizontal periods corresponding to pixel rows.

An initialization voltage VINT may be applied to the sensing line lk.

Data voltages DS(i−1)j, DSij, and DS(i+1)j may be sequentially applied to the data line Dj in a horizontal period unit. A first scan signal of a turn-on level (logic high level) may be applied to the first scan line S1*i* in a corresponding horizontal period. In such an embodiment, a second scan signal of a turn-on level may be applied to the second scan line S2*i* in synchronization with the first scan line S1*i* in the corresponding horizontal period.

In one embodiment, for example, when the scan signals of the turn-on level are applied to the first scan line S1*i* and the second scan line S2*i*, the second transistor T2 and the third transistor T3 may be turned on. Therefore, a voltage corresponding to a difference between the data voltage DSij and the initialization voltage VINT is written to the storage capacitor Cst of the pixel PXij.

When the scan signals of the turn-on level are applied to the first scan line S1*i* and the second scan line S2*i*, a difference between the initialization voltage VINT applied to the second node N2 and the power voltage of the power line ELVSS may be less than a threshold voltage of the light emitting diode LD, such that the light emitting diode LD may be in a non-emission state.

Thereafter, when a scan signal of a turn-off level (logic low level) is applied to the first scan line S1*i* and the second scan line S2*i*, the second transistor T2 and the third transistor T3 may be turned off. Therefore, regardless of a voltage change of the data line Dj, the voltage difference between the gate electrode and the source electrode of the first transistor T1 may be maintained by the storage capacitor Cst.

Accordingly, a driving path connecting the power line ELVDD, the first transistor T1, the light emitting diode LD, and the power line ELVSS may be formed. An emission luminance of the light emitting diode LD may be determined according to a driving current flowing through the driving path.

The driving current may be expressed as Equation 1 below.

$$Ids=(1/2)*(W/L)*u*Cox*((\text{Vdata-Vanode-}Vth)^{\wedge}2)*(1+Imd*(\text{Velvdd-Vanode})) \quad \text{[Equation 1]}$$

Here, Ids denotes a driving current flowing between a drain electrode and the source electrode of the first transistor T1, W denotes a channel width of the first transistor T1, L denotes a channel length of the first transistor T1, u denotes a mobility of the first transistor T1, Cox denotes a capacitance formed by a channel, an insulating layer, and the gate electrode of the first transistor T1, Vdata denotes the data voltage DSij, Vanode denotes an anode voltage of the light emitting diode LD, Vth denotes a threshold voltage of the first transistor T1, Imd rid denotes a constant, and Velvdd denotes the power voltage of the power line ELVDD.

In addition, Vanode may be expressed as Equation 2 below.

$$Vanode=Velvss+Vel \quad \text{[Equation 2]}$$

Here, Velvss denotes the power voltage of the power line ELVSS, and Vel denotes a voltage difference between both ends of the light emitting diode LD.

The structure and driving method of an embodiment of the pixel PXij is described above with reference to FIGS. 1 to 3, but the invention is not limited thereto. Embodiments to be described later may be applied to any pixel structure and driving method known in the art. In one embodiment, for example, where the sensing unit 15 and the second scan lines S21, S22, and S2*n* are not provided, the disclosure or teachings herein may be applied thereto by excluding the third transistor T3 of the pixel PXij.

Figure 4:
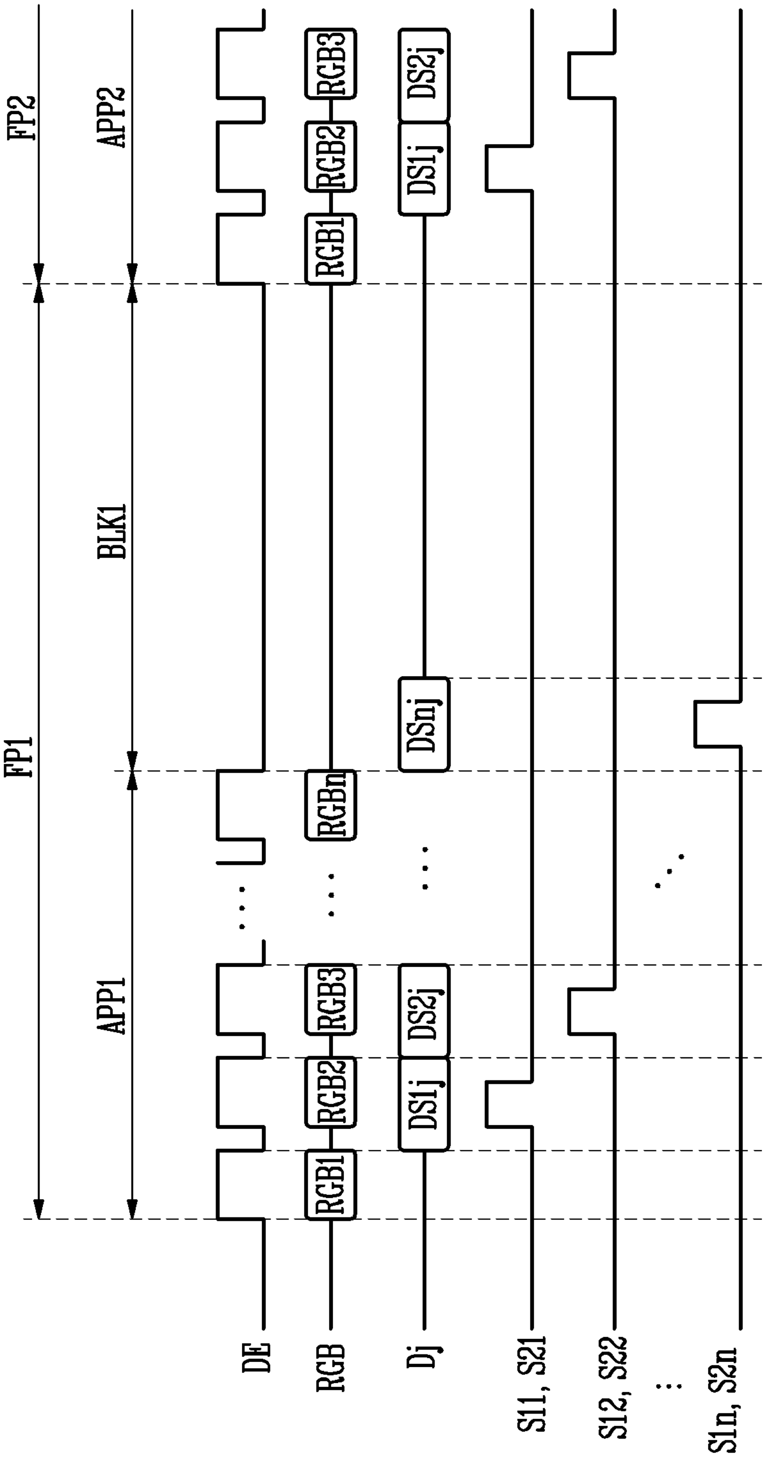
FIG. 4 is a diagram illustrating a method of driving a display device according to an embodiment of the disclosure.

FIG. 4 is a diagram illustrating a method of driving a display device according to an embodiment of the disclosure.

FIG. 4 shows an embodiment where the first frame period FP1 and the second frame period FP2 are two consecutive frames. The first frame period FP1 may include a first active period APP1 and a first blank period BLK1. The second frame period FP2 may include a second active period APP2 and a second blank period. In such an embodiment, the first frame period FP1 and the second frame period FP2 are substantially the same as each other. Accordingly, for convenience of description, the first frame period FP1 will be describe in detail, and any repetitive detailed description of the second frame period FP2 will be omitted or simplified.

In the first active period APP1 of the first frame period FP1, the data enable signal DE of the enable level (for example, a logic high level) may be supplied in the horizontal period unit. In the first active period APP1, grayscale data RGB1, RGB2, RGB3, and RGBn of the horizontal line unit may be supplied in synchronization with the data enable signal DE of the enable level.

The data driver 12 may receive processed or unprocessed grayscale data RGB1, RGB2, RGB3, and RGBn from the timing controller 11. According to an embodiment, the data driver 12 may receive the grayscale data RGB1 of the horizontal line unit in serial, and when the reception is completed, the data driver 12 may latch the grayscale data RGB1 in parallel to generate the data voltages. Among such data voltages, a j-th data voltage DS1*j* may be applied to a j-th data line Dj. Similarly, some of the grayscale data RGB2 may be output as a data voltage DS2*j* in a next horizontal period, and some of the grayscale data RGBn may be output as a data voltage DSnj in another next horizontal period.

As the scan signals of the turn-on level (for example, a logic high level) are sequentially applied to the scan lines S11, S21, S12, S22, S1*n*, and S2*n*, the data voltages applied to the data lines may be written to corresponding pixels. In one embodiment, for example, when the scan signals of the turn-on level are applied to the scan lines S11 and S21, data voltages DS1*j*, . . . may be written to pixels of a first horizontal line (or pixel row). Next, when the scan signals of the turn-on level are applied to the scan lines S12 and S22, data voltages DS2*j, . . . may be written to pixels of a second horizontal line. As described above, when the scan signals of the turn-*on level are applied to the scan lines Sin and S2*n*, the data voltages DSnj, . . . may be written to pixels of a last horizontal line.

In the first blank period BLK1 of the first frame period FP1, the data enable signal DE of the disable level (for example, a logic low level) may be supplied. In the first blank period BLK1, the supply of the grayscale data may be stopped.

Figure 5:
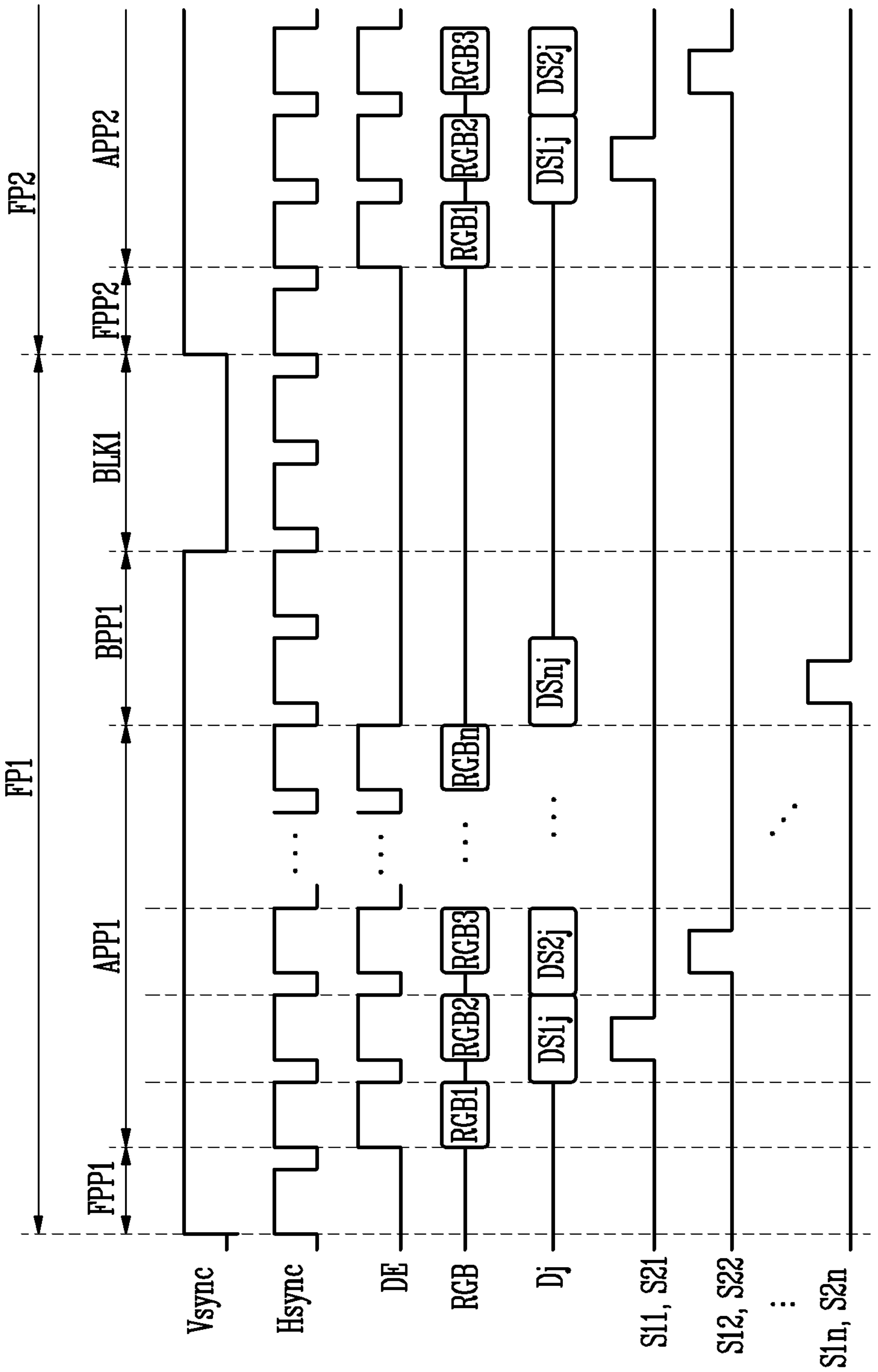
FIG. 5 is a diagram illustrating a method of driving a display device according to an alternative embodiment of the disclosure.

FIG. 5 is a diagram illustrating a method of driving a display device according to an alternative embodiment of the disclosure.

Referring to FIG. 5, in an embodiment, the processor 10 may supply the vertical synchronization signal Vsync and the horizontal synchronization signal Hsync to the timing controller 11.

In one embodiment, for example, the first frame period FP1 may include a first front porch period FPP1, a first active period APP1, a first back porch period BPP1, and a first blank period BLK1. In one embodiment, for example, the second frame period FP2 may include a second front porch period FPP2, a second active period APP2, a second back porch period (not shown), and a second blank period (not shown).

In one embodiment, for example, the first front porch period FPP1 may be a period in which the vertical synchronization signal Vsync is a logic high level and the data enable signal DE is a logic low level, and may be a period before the supply of the grayscale data RGB1, RGB2, RGB3, and RGBn is started.

In one embodiment, for example, the first active period APP1 may be a period in which the vertical synchronization signal Vsync is a logic high level and the data enable signal DE includes pulses of the enable level, and may be a period in which the grayscale data RGB1, RGB2, RGB3, and RGBn are supplied.

In one embodiment, for example, the first back porch period BPP1 may be a period in which the vertical synchronization signal Vsync is a logic high level and the data enable signal DE is a logic low level, and may be a period after the supply of the grayscale data RGB1, RGB2, RGB3, and RGBn is ended.

In one embodiment, for example, the first blank period BLK1 may be a period in which the vertical synchronization signal Vsync is a logic low level and the data enable signal DE is a logic low level.

In such an embodiment, the data enable signal DE, the grayscale data RGB, the data voltages DS1*j*, DS2*j*, and DSnj, and the scan signals are the same as those described above with reference to FIG. 4, and any repetitive detailed description thereof will be omitted.

Figure 6:
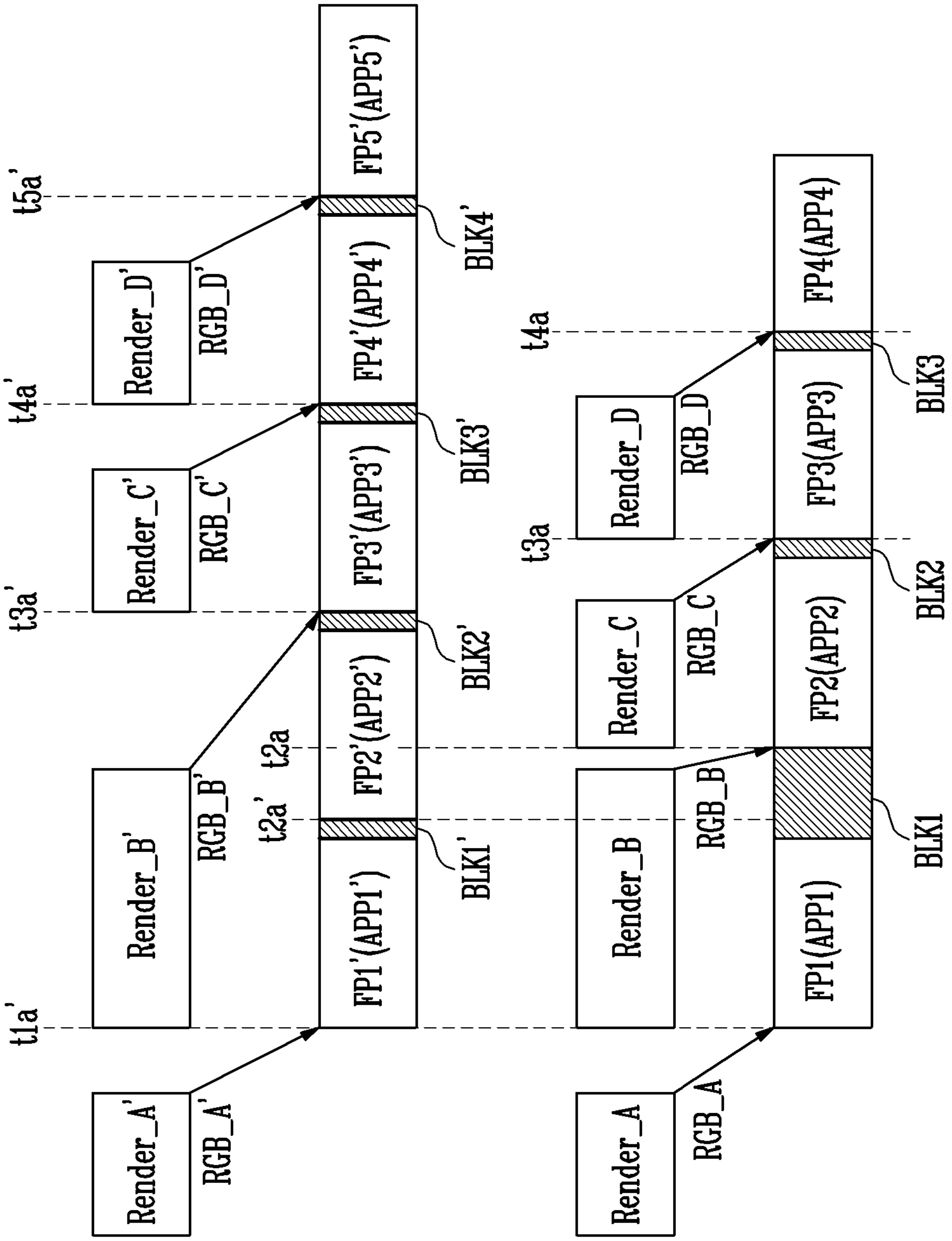
FIG. 6 is a diagram illustrating a method of matching a rendering speed and a display frequency according to an embodiment of the disclosure.

FIG. 6 is a diagram illustrating a method of matching a rendering speed and a display frequency according to an embodiment of the disclosure.

An upper diagram of FIG. 6 shows a comparative example for matching a rendering speed and a display frequency when the rendering speed and the display frequency do not correspond to each other. In the comparative example, lengths of blank periods BLK1', BLK2', BLK3', and BLK4' are the same as each other. Therefore, in the comparative example, lengths of the frame periods FP1', FP2', FP3', FP4', and FP5' are the same as each other. For convenience of illustration and description, a case where rendering periods Render_A', Render_C', and Render_D' are shorter than the frame period and the rendering period Render_B' is longer than the frame period is shown in FIG. 6.

In a comparative example, the processor 10 may perform rendering on an A' image during the rendering period Render_A'. At a time point t1*a*' after an end of the rendering period Render_A', grayscale data RGB_A' for the A' image may be provided to the timing controller 11. A first active period APP1' and a first blank period BLK1' of the first frame period FP1' may proceed in correspondence with the grayscale data RGB_A' (refer to the driving method of FIG. 4 or 5). That is, the first frame may display the A' image.

After the time point t1*a*', the processor 10 may perform rendering on a B' image during the rendering period Render_B'. In one embodiment, for example, the rendering period Render_B' may end after a time point t2*a*' at which a second frame period FP2' starts. When grayscale data RGB_B' is provided during a second active period APP2', a second frame may display the A' image and the B' image simultaneously, and thus a tearing issue may occur. Therefore, the processor 10 does not provide the grayscale data RGB_B' during the second frame period FP2', and thus the second frame displays the A' image. Accordingly, a stuttering issue in which the first frame and the second frame display the same A' image occurs.

The processor 10 may provide the grayscale data RGB_B' for the B' image at a time point t3*a*' at which a third frame period FP3' starts during a third active period APP3'. Accordingly, the third frame displays the B' image.

Similarly, grayscale data RGB_C' for a C' image may be provided at a time point t4*a*' during a fourth active period APP4', and thus a fourth frame may display the C' image. Grayscale data RGB_D' for a D' image may be provided at a time point t5*a*' during a fifth active period APP5', and thus a fifth frame may display the D' image.

A lower diagram of FIG. 6 shows an embodiment of the invention for matching the rendering speed and the display frequency when the rendering speed and the display frequency do not correspond to each other. In such an embodiment, lengths of blank periods BLK1, BLK2, and BLK3 may be different from each other. Therefore, in such embodiment, lengths of frame periods FP1, FP2, FP3, and FP4 may be different from each other. For convenience of illustration and description, a case where rendering periods Render_A, Render_C, and Render_D are shorter than the frame period and a rendering period Render_B is longer than the frame period is show in FIG. 6.

At a time point t1*a*', the processor 10 may provide grayscale data RGB_A for an A image, and thus a first frame FP1 may display the A image.

The processor 10 may extend the length of the first blank period BLK1 when the rendering period Render_B for a B image is not ended at a time point t2*a*'. In one embodiment, for example, the processor 10 may extend the length of the first blank period BLK1 by extending a period for maintaining the data enable signal DE as the disable level (refer to FIGS. 4 and 5). In such an embodiment, the processor 10 may extend the length of the first blank period BLK1 by extending a period in which the vertical synchronization signal Vsync is maintained as the logic low level (refer to FIG. 5).

At a time point t2*a* after an end of the rendering period Render_B, the processor 10 may provide grayscale data RGB_B. Accordingly, a second frame FP2 may display the B image. In such an embodiment, at a time point t3*a* after an end of the rendering period Render_C, the processor 10 may provide grayscale data RGB_C such that a third frame FP # may display a C image. In such an embodiment, At a time point t4*a* after an end of the rendering period Render_D, the processor 10 may provide grayscale data RGB_D such that a fourth frame FP4 may display a D image.

According to an embodiment of the invention, as described above, images may be displayed faster than the comparative example without tearing and stuttering issues.

Figure 7:
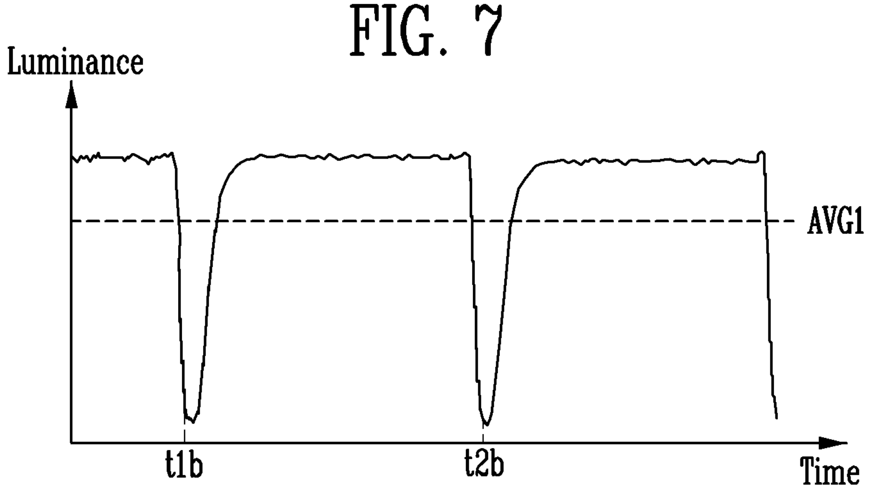
FIG. 7 is a diagram illustrating a luminance change of a pixel when a display frequency is relatively small.
Figure 8:
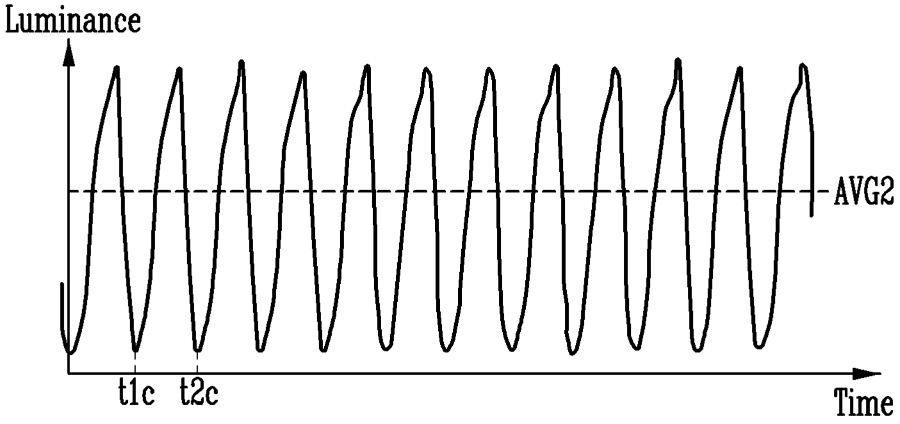
FIG. 8 is a diagram illustrating the luminance change of the pixel when the display frequency is relatively large.

FIG. 7 is a diagram illustrating a luminance change of a pixel when a display frequency is relatively low. FIG. 8 is a diagram illustrating the luminance change of the pixel when the display frequency is relatively high.

Referring to FIG. 7, for example, a time point t1*b* may be a time point at which the initialization voltage VINT is applied to the second node N2 of the pixel PXij in one horizontal period. As described above, at this time, since the light emitting diode LD is in the non-emission state, a luminance of the pixel PXij may decrease.

A time point t2*b* may be a time point at which the initialization voltage VINT is applied to the second node N2 of the pixel PXij in a next horizontal period. As described above, at this time, since the light emitting diode LD is in the non-emission state, the luminance of the pixel PXij may decrease.

Similarly, in a case where the display frequency is relatively high as shown in FIG. 8, a time point t1*c* and a time point t2*c* may be time points at which the light emitting diode LD is in the non-emission state in each horizontal period. Since FIG. 7 is a case where the display frequency is relatively low and FIG. 8 is a case where the display frequency is relatively high, a period t1*c* to t2*c* is shorter than a period t1*b* to t2*b*. Based on the same period, in the case of FIG. 8, a non-emission period of the light emitting diode LD is longer than that of FIG. 7. Accordingly, an average luminance AVG2 in the case of FIG. 8 becomes less than an average luminance AVG1 in the case of FIG. 7. That is, since the average luminance decreases as the display frequency increases and the average luminance increases as the display frequency decreases, such cases are desired to be compensated.

In an embodiment, when the display frequency increases, compensation is desired to be performed so that the luminance is increased. Referring to Equations 1 and 2, when the power voltage Velvss of the power line ELVSS is decreased, the driving current Ids may be increased, and thus the luminance of the pixel PXij may be increased. In addition, when the power voltage Velvdd of the power line ELVDD is increased, the driving current Ids may be increased. In addition, even in a case where a difference between the power voltage Velvdd and the power voltage Velvss is increased, the driving current Ids may be increased.

In such an embodiment, when the display frequency decreases, compensation is desired to be performed so that the luminance is decreased. When the power voltage Velvss of the power line ELVSS is increased, the driving current Ids may be decreased, and thus the luminance of the pixel PXij may be decreased. In addition, even in a case where the power voltage Velvdd of the power line ELVDD is decreased, the driving current Ids may be decreased. In addition, even in a case where the difference between the power voltage Velvdd and the power voltage Velvss is decreased, the driving current Ids may be decreased.

Figure 9:
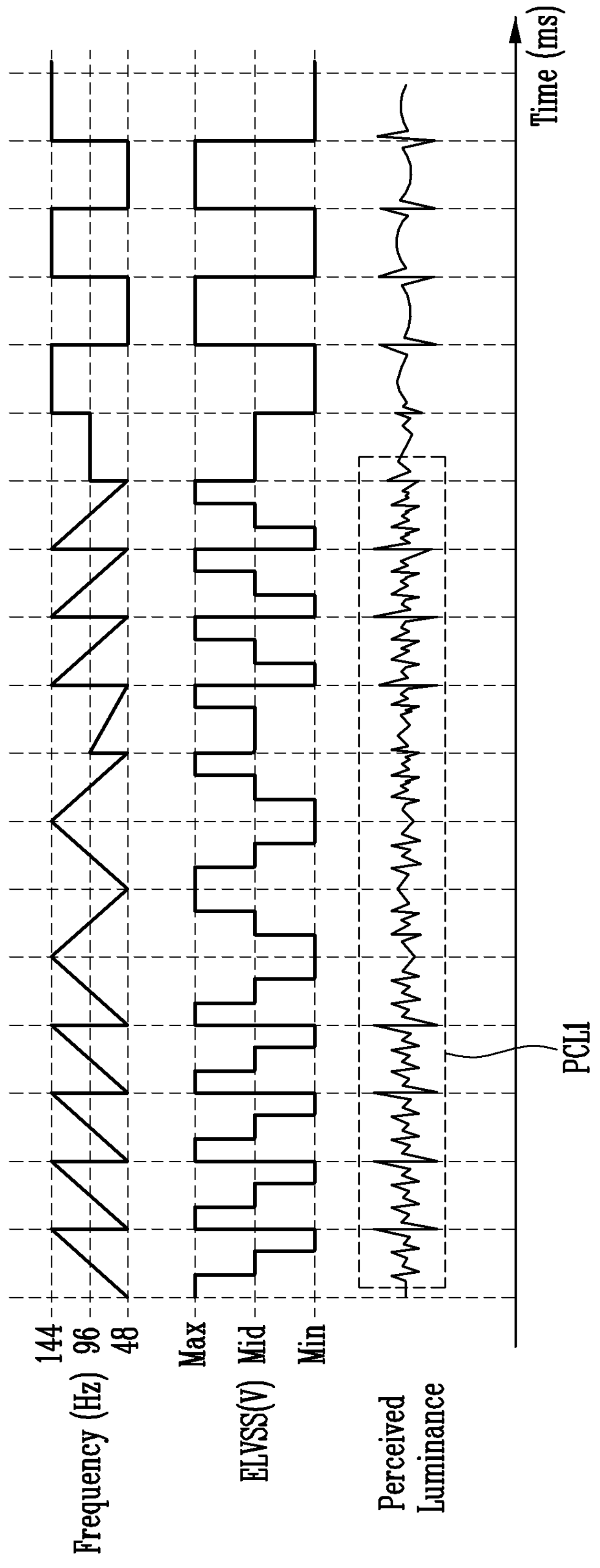
FIG. 9 is a diagram illustrating a recognized luminance of a display device when a power voltage is converted based on a magnitude of a display frequency.

FIG. 9 is a diagram illustrating a recognized luminance of a display device when a power voltage is converted based on a magnitude of a display frequency.

Referring to FIG. 9, in an embodiment, the compensation may be performed by a method including decreasing the power voltage of the power line ELVSS when the display frequency is increased and increasing the power voltage of the power line ELVSS when the display frequency is decreased.

In such an embodiment, the average luminance may be compensated, but flicker due to a frequent change of the power voltage may be visually recognized (refer to an observation region PCL1). In particular, as shown in FIG. 6, when lengths of the frame periods FP1, FP2, FP3, and FP4 are frequently changed, that is, when the display frequency is frequently changed, such a flicker issue may more frequently occur.

Figure 10:
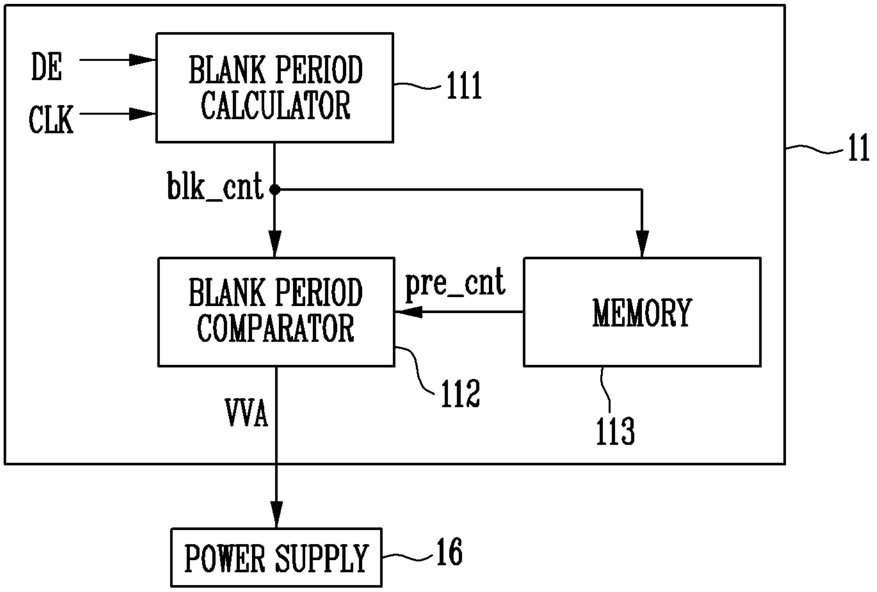
FIG. 10 is a diagram illustrating a timing controller according to an embodiment of the disclosure.

FIG. 10 is a diagram illustrating a timing controller according to an embodiment of the disclosure.

Referring to FIG. 10, an embodiment of the timing controller 11 according to the disclosure may include a blank period calculator 111, a blank period comparator 112, and a memory 113.

The blank period calculator 111 may calculate a blank count value blk_cnt by counting a current blank period (for example, the second blank period BLK2) using a clock signal CLK. The blank period calculator 111 may count the current blank period (for example, the second blank period BLK2) while the data enable signal DE is in the disable level.

A period of the clock signal CLK may be shorter than one horizontal period. In one embodiment, for example, one horizontal period may be an integer multiple of the period of the clock signal CLK. In one embodiment, for example, the clock signal CLK may be a clock signal used to sample the grayscale data RGB.

The memory 113 may provide a previous count value pre_cnt for a previous blank period (for example, the first blank period BLK1).

Figure 11:
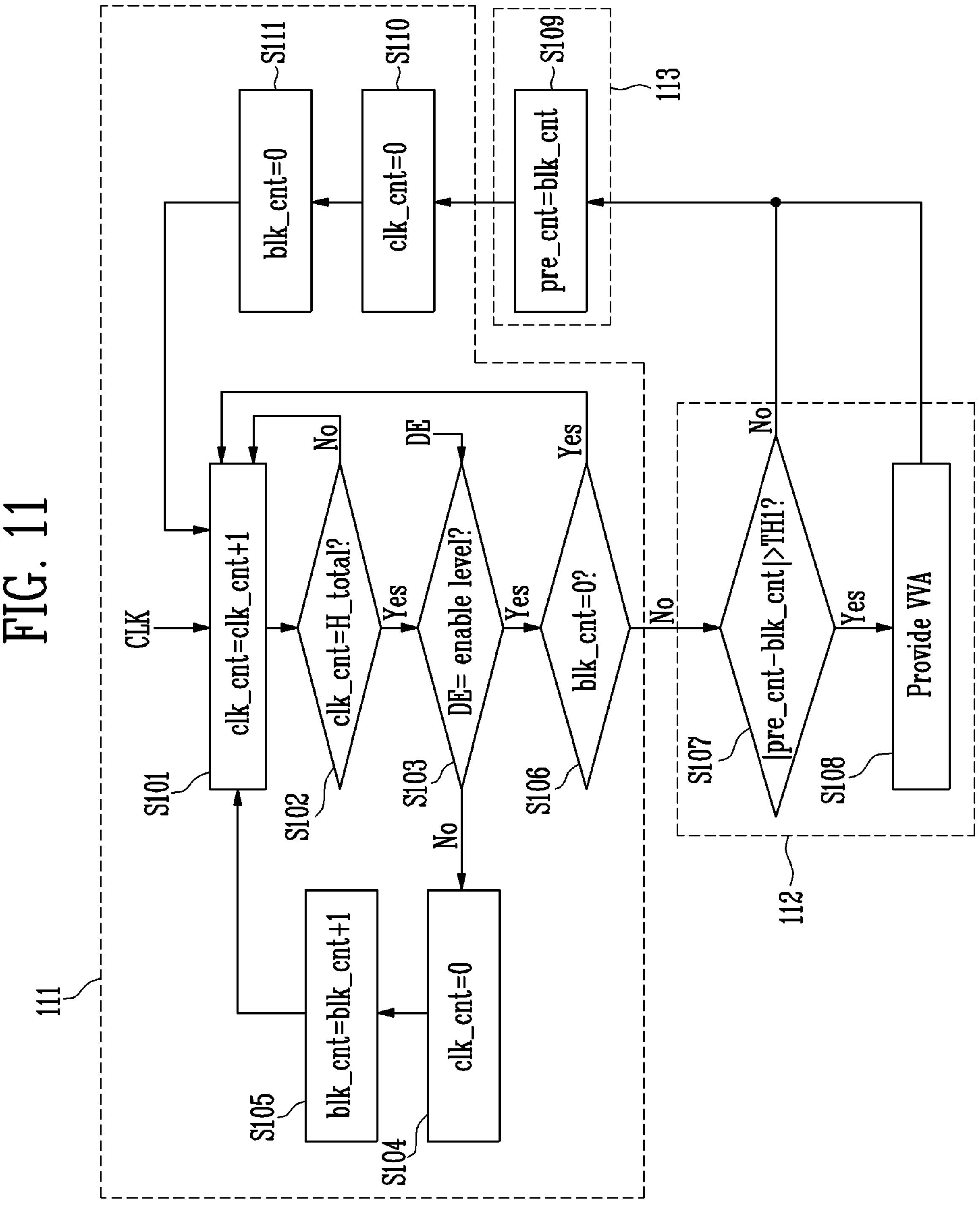
FIG. 11 is a diagram illustrating an algorithm of a timing controller according to an embodiment of the disclosure.

The blank period comparator 112 may generate a change signal VVA when a difference between the blank count value blk_cnt and the previous count value pre_cnt is greater than a threshold value TH1 (shown in FIG. 11). In such an embodiment, an absolute value of the difference between the blank count value blk_cnt and the previous count value pre_cnt may be compared with the threshold value TH1.

The threshold value TH1 may be appropriately set or preset according to a product. Therefore, flicker occurrence may be alleviated by generating the change signal VVA only when the display frequency rapidly changes. In such an embodiment, the power voltage may be converted based on a change rate of the display frequency as well as the magnitude of the display frequency.

In an embodiment, the change signal VVA may directly or indirectly include information on the voltage level of the power voltage. The voltage level of the power voltage may be previously provided as a look-up table ("LUT") according to the display frequency.

In an embodiment, the power supply 16 may supply the power voltage having the voltage level changed based on the change signal VVA to the power line ELVSS. In one embodiment, for example, when the second blank period BLK2 is longer than the first blank period BLK1, the power supply 16 may supply the power voltage having the increased voltage level to the second power line ELVSS. In such an embodiment, when the second blank period BLK2 is shorter than the first blank period BLK1, the power supply 16 may supply the power voltage having the decreased voltage level to second the power line ELVSS.

In an alternative embodiment, the power supply 16 may supply the power voltage having the voltage level changed based on the change signal VVA to the first power line ELVDD. In one embodiment, for example, when the second blank period BLK2 is longer than the first blank period BLK1, the power supply 16 may supply the power voltage having the decreased voltage level to the first power line ELVDD. In such an embodiment, when the second blank period BLK2 is shorter than the first blank period BLK1, the power supply 16 may supply the power voltage having the increased voltage level to the first power line ELVDD.

In another alternative embodiment, the power supply 16 may supply the power voltages having the voltage level changed based on the change signal VVA to the first and second power lines ELVDD and ELVSS. In one embodiment, for example, when the second blank period BLK2 is longer than the first blank period BLK1, the power supply 16 may supply the power voltages so that the difference between the power voltage of the first power line ELVDD and the power voltage of the second power line ELVSS is decreased. In such an embodiment, when the second blank period BLK2 is shorter than the first blank period BLK1, the power supply 16 may supply the power voltages so that the difference between the power voltage of the first power line ELVDD and the power voltage of the second power line ELVSS is increased.

After a comparison operation of the blank period comparator 112, the memory 113 may update the previous count value pre_cnt to the blank count value blk_cnt.

FIG. 11 is a diagram illustrating an algorithm of a timing controller according to an embodiment of the disclosure.

The blank period calculator 111 may increase a clock count value clk_cnt by 1 for each period of the clock signal CLK (S101). Such a process S101 may be repeated until the clock count value clk_cnt corresponds to one horizontal period H_total (S102).

When the clock count value clk_cnt corresponds to one horizontal period H_total, the blank period calculator 111 may check whether the data enable signal DE is the enable level (S103).

When a current time point is within the blank period, the data enable signal DE may be in the disable level, and the blank period calculator 111 may initialize the clock count value clk_cnt (S104). In addition, the blank period calculator 111 may increase the blank count value blk_cnt by 1 (S105).

By repeating such processes S101 to S105 described above, the blank count value blk_cnt corresponding to a current blank period may be calculated. The blank period calculator 111 may check that the blank period is ended by checking that the data enable signal DE is in the enable level (S103).

When the blank period calculator 111 checks that the blank count value blk_cnt is not 0 (S106), the blank period comparator 112 may determine whether the difference (for example, the absolute value) between the previous count value pre_cnt and the blank count value blk_cnt is greater than the threshold value TH1 (S107). When the blank count value blk_cnt is 0, the blank count value blk_cnt may indicate that the current time point is within the active period, and the algorithm may be repeated from the process S101.

When the difference between the previous count value pre_cnt and the blank count value blk_cnt is greater than the threshold value TH1, the blank period comparator 112 may provide the change signal VVA (S108).

The memory 113 may update the previous count value pre_cnt to the blank count value blk_cnt (S109). In addition, the blank period calculator 111 may initialize the clock count value clk_cnt to 0 (S110) and initialize the blank count value blk_cnt to 0 (S111).

Figure 12:
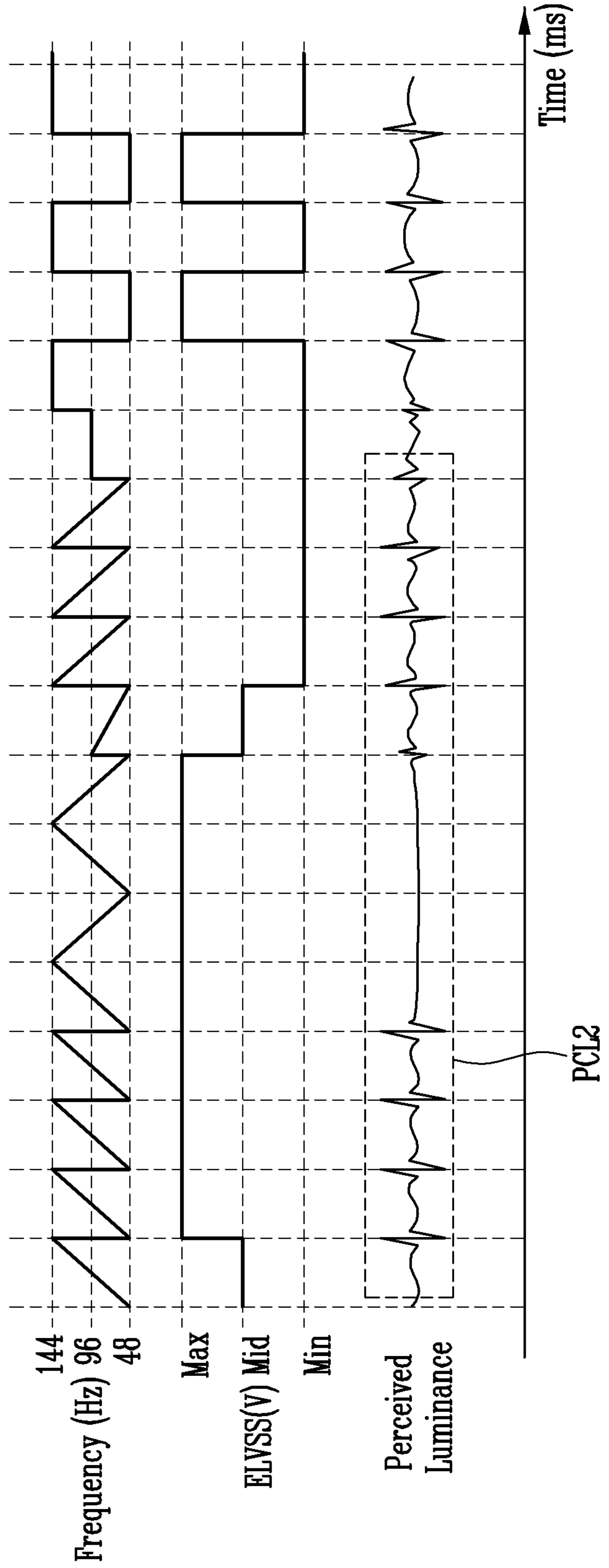
FIG. 12 is a diagram illustrating a recognized luminance of a display device when a power voltage is converted based on a change rate and a magnitude of a display frequency.

FIG. 12 is a diagram illustrating a recognized luminance of a display device when a power voltage is converted based on a change rate and a magnitude of a display frequency.

FIG. 12 is a graph of a case where the embodiment of FIGS. 10 and 11 is applied.

Referring to FIG. 12, in an embodiment, in a period in which the display frequency is gradually changed (for example, a SAW waveform), the difference (for example, the absolute value of the difference) between the previous count value pre_cnt and the blank count value blk_cnt is less than the threshold value TH1, and thus the power voltage of the power line ELVSS is not changed.

In such an embodiment, in a period in which the display frequency radically changes (for example, a vertical rising or a vertical falling), the difference (for example, the absolute value of the difference) between the previous count value pre_cnt and the blank count value blk_cnt is greater than the threshold value TH1, and thus the power voltage of the power line ELVSS is changed. However, the power voltage of the power line ELVSS may be set to be changed only within a predetermined range (Min to Max).

When compared with the observation region PCL1 of FIG. 9, referring to an observation region PCL2, it may be seen that a frequency of occurrence of flicker is low while the average luminance is compensated.

FIG. 12 shows an embodiment where the power voltage of the second power line ELVSS is changed. In an alternative embodiment, as described above, the power voltage of the first power supply line ELVDD may be changed. In another alternative embodiment, as described above, the power voltages of the first and second power lines ELVDD and ELVSS (refer to the description of FIG. 10) may be changed.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a processor which supplies grayscale data in active periods of frame periods and stops supply of the grayscale data in blank periods of the frame periods;

a power supply which supplies a first power voltage to a first power line; and pixels commonly connected to the first power line, wherein the blank periods include a first blank period of a first frame period and a second blank period of a second frame period, wherein when the second blank period is longer than the first blank period, the power supply supplies the first power voltage having an increased voltage level, and wherein when the second blank period is shorter than the first blank period, the power supply supplies the first power voltage having a decreased voltage level.

2. The display device according to claim 1, wherein the first frame period is a frame period previous to the second frame period.

3. The display device according to claim 1, further comprising:

a timing controller which generates a change signal when a difference between the first blank period and the second blank period is greater than a threshold value; and a power supply which supplies the first power voltage having a voltage level changed based on the change signal.

4. The display device according to claim 3, wherein the power supply supplies a second power voltage to a second power line, the pixels are commonly connected to the second power line, and when the second blank period is longer than the first blank period, the power supply supplies the first power voltage and the second power voltage in a way such that a difference between the first power voltage and the second power voltage decreases.

5. The display device according to claim 4, wherein when the second blank period is shorter than the first blank period, the power supply supplies the first power voltage and the second power voltage in a way such that the difference between the first power voltage and the second power voltage increases.

6. The display device according to claim 3, wherein the timing controller comprises:

a blank period calculator which calculates a blank count value by counting the second blank period using a clock signal;

a memory which provides a previous count value for the first blank period; and a blank period comparator which generates the change signal when a difference between the blank count value and the previous count value is greater than the threshold value.

7. The display device according to claim 6, wherein the processor provides a data enable signal in an enable level while the grayscale data is supplied and provides the data enable signal in a disable level during the blank periods, and the blank period calculator counts the second blank period while the data enable signal is in the disable level.

8. The display device according to claim 7, wherein the memory updates the previous count value to the blank count value.

9. A display device comprising:

a processor which supplies grayscale data in active periods of frame periods and stops supply of the grayscale data in blank periods of the frame periods;

a power supply which supplies a first power voltage to a first power line; and pixels commonly connected to the first power line, wherein the blank periods include a first blank period of a first frame period and a second blank period of a second frame period, wherein when the second blank period is longer than the first blank period, the power supply supplies the first power voltage having a decreased voltage level, and wherein when the second blank period is shorter than the first blank period, the power supply supplies the first power voltage having an increased voltage level.

10. The display device according to claim 9, wherein the first frame period is a frame period previous to the second frame period.

11. The display device according to claim 9, further comprising:

a timing controller which generates a change signal when a difference between the first blank period and the second blank period is greater than a threshold value; and a power supply which supplies the first power voltage having a voltage level changed based on the change signal.

12. The display device according to claim 11, wherein the power supply supplies a second power voltage to a second power line, the pixels are commonly connected to the second power line, and when the second blank period is longer than the first blank period, the power supply supplies the first power voltage and the second power voltage in a way such that a difference between the first power voltage and the second power voltage decreases.

13. The display device according to claim 12, wherein when the second blank period is shorter than the first blank period, the power supply supplies the first power voltage and the second power voltage in a way such that the difference between the first power voltage and the second power voltage increases.

14. The display device according to claim 11, wherein the timing controller comprises:

a blank period calculator which calculates a blank count value by counting the second blank period using a clock signal;

a memory which provides a previous count value for the first blank period; and a blank period comparator which generates the change signal when a difference between the blank count value and the previous count value is greater than the threshold value.

15. The display device according to claim 14, wherein the processor provides a data enable signal in an enable level while the grayscale data is supplied and provides the data enable signal in a disable level during the blank periods, and the blank period calculator counts the second blank period while the data enable signal is in the disable level.

16. The display device according to claim 15, wherein the memory updates the previous count value to the blank count value.

* * * * *